US006735524B1

(12) United States Patent
Challoner et al.

(10) Patent No.: US 6,735,524 B1
(45) Date of Patent: May 11, 2004

(54) SPATIALLY RESOLVED AND SPATIALLY AWARE ANTENNA FOR RADIO NAVIGATION

(75) Inventors: A. Dorian Challoner, Manhattan Beach, CA (US); James M. Bornholdt, Wildwood, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/315,872

(22) Filed: Dec. 10, 2002

(51) Int. Cl.[7] .......................... G01C 21/00; H01R 3/00

(52) U.S. Cl. ...................... 701/220; 701/213; 340/988; 340/435; 340/995; 342/358; 342/357.06; 342/444; 342/357.14

(58) Field of Search ............................ 701/23, 26, 45, 701/207, 213, 214, 220; 340/435, 436, 438, 439, 457.1, 988, 995; 342/357.11, 357.14, 358, 357.06, 359, 453, 458, 444; 318/587; 244/3.2; 455/431, 456

(56) References Cited

U.S. PATENT DOCUMENTS

| | | | | |
|---|---|---|---|---|
| 4,883,244 A | | 11/1989 | Challoner et al. | 244/171 |
| 5,546,309 A | * | 8/1996 | Johnson et al. | 701/13 |
| 6,598,009 B2 | * | 7/2003 | Yang | 702/152 |
| 6,639,553 B2 | * | 10/2003 | Lin et al. | 342/444 |
| 2002/0105461 A1 | * | 8/2002 | Fukushima et al. | 342/359 |
| 2002/0133958 A1 | * | 9/2002 | Noureldin et al. | 33/304 |
| 2003/0135327 A1 | * | 7/2003 | Levine et al. | 701/220 |
| 2003/0167863 A1 | * | 9/2003 | Denice et al. | 73/866.5 |

* cited by examiner

*Primary Examiner*—Thomas G. Black
*Assistant Examiner*—Tuan C To
(74) *Attorney, Agent, or Firm*—Gates & Cooper LLP

(57) ABSTRACT

A method and apparatus for radio navigation and location is disclosed. The method uses an autonomous, on-board micro-inertial navigation system to propagate the state of a station, and an angularly resolvable antenna to measure relative orientation and relative range and to receive estimated state information from one or more companion stations. Optimally estimated state information is used to permit operation in environments that are otherwise hostile to communications between stations.

72 Claims, 6 Drawing Sheets

502
504
$\Phi_{initial}$
$\Phi_0$
$\Phi_{0_{est}}$
$\vartheta$
$R_{0\ to\ n}$
$\Phi_{n_{est}}$
To Comm Module 210
$\omega, a$
$\Theta_n$
$\Phi_n$
RESOLVER
214
202
IRU
RECEIVER
208

SPATIALLY RESOLVED AND SPATIALLY AWARE ANTENNA FOR RADIO NAVIGATION

BACKGROUND OF THE INVENTION

1. Field of the Invention

The present invention relates to systems and methods for radio navigation, and in particular to a system and method for radio navigation using a spatially resolved antenna.

2. Description of the Related Art

In recent years, there has been an increasing need for remote and mobile location systems. For example, there is a need for cellular telephone (cellphone) systems that can locate users, particularly when the user has dialed 911 or other emergency number. There is also a need to locate large numbers of military or fire personnel who can be located over large areas. Further, this capability must be provided in places where line of sight between locating elements are obscured or compromised by multipath distortions (e.g. environments such as urban locations and rugged terrain). These factors limit the accuracy and hence, the usefulness of the location system.

There is further a need to provide secure communications between large numbers of widely distributed receiving/transmitting agents. One way to accomplish this feat is through the use of narrow beam communication signals directed at the intended recipient of the message. Unfortunately this requires accurate information regarding the location of the intended recipient relative to the location of the transmitting agent What is needed is an accurate, but inexpensive location system that provides adequate location accuracy and availability even in environments that are ordinarily not suitable for radio location. The present invention satisfies that need.

SUMMARY OF THE INVENTION

To address the requirements described above, the present invention discloses a method, apparatus, article of manufacture, of radio navigation among a plurality of stations $S_0, S_1, \ldots, S_i$. The method comprises the steps of propagating a state $\Phi_0$ of a first station $S_0$ according to autonomous, or self-contained, inertial measurements, wherein the state $\Phi_0$ includes the position $P_0[x_0,y_0]$ of the first station, wherein $x_0$ is the position of the first station along a first axis, and $y_0$ is the position of the first station along a second axis orthogonal to the first axis, receiving a signal in the first station $S_0$ and resolving the received signal to at least one angular sector $\theta$ in a plane formed by the first axis x and the second axis y, the received signal comprising first information describing an estimated state $\Phi_1$ of a second station $S_1$, wherein the state $\Phi_1$ includes a position $P_1[x_0,y_0]$ of the second station $S_1$, and estimating the state $\Phi_0$ of the first station $S_0$ at least in part from the propagated state $\dot{\Phi}_0$, the resolved angular sector and the relative range $R_{10}$ of the second station $S_1$ and the first information. The apparatus comprises an inertial reference unit for generating inertial measurements of a state of the first station, a navigation module, for propagating the state $\Phi_0$ of the first station $S_0$ based upon the inertial measurements wherein the state $\Phi_0$ includes the position $P_0[x_0,y_0]$ of the first station, wherein $x_0$ is the position of the first station along a first axis, and $y_0$ is the position of the first station along a second axis orthogonal to the first axis, at least one antenna communicatively coupled to a receiver for receiving a signal comprising first information describing an estimated state $\Phi_1$ of a second station $S_1$, wherein the state $\Phi_0$ includes a position $P_1[x_0,y_0]$ of the second station $S_2$, a resolver, for resolving the received signal to at least one angular sector $\theta$ in a plane formed by the first axis x and the second axis y and radio rangefinder for measuring $R_{10}$, the relative range of the second station $S_1$ with respect to the first station, $S_0$ The navigation module further estimates the state $\Phi_0$ of the first station $S_0$ at least in part from the propagated state $\dot{\Phi}_0$, the resolved angular sector $\theta$, relative range $R_{10}$ and the first information.

The foregoing provides location services in environments without a line of sight between elements, and mitigates multipath and signal attenuation problems from nearby structures and terrain features.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

The location of an objects via relative range measurements and triangulation is well known. Finding a position of an object in a two-dimensional plane (e.g. latitude and longitude) requires the at least two independent range measurements from two different and known locations. The two range measurements can be obtained from one other station if a range measurement is taken to the other station at two different locations (e.g. the other station transmits from a first location, moves, then transmits from a second location). Or, the two range measurements can be taken from two different "other" stations. Similarly, if a position in three dimensions is desired, three range measurements must be obtained.

Triangulation has been used to allow autonomous navigation of a constellation of satellites (e.g. the Global Positioning System, or GPS). GPS autonavigation systems typically include an omnidirectional antenna to receive signals from each of the constellation member satellites, and a Kalman filter on board each satellite to update its orbital parameters. Such systems can be extended using active agile beam antennae to provide attitude determination as well, as described in U.S. Pat. No. 4,883,244, which is hereby incorporated by reference herein. Unfortunately, triangulation via the transmission and reception of radio transmissions can be problematic when applied to terrestrial systems.

Figure 1:
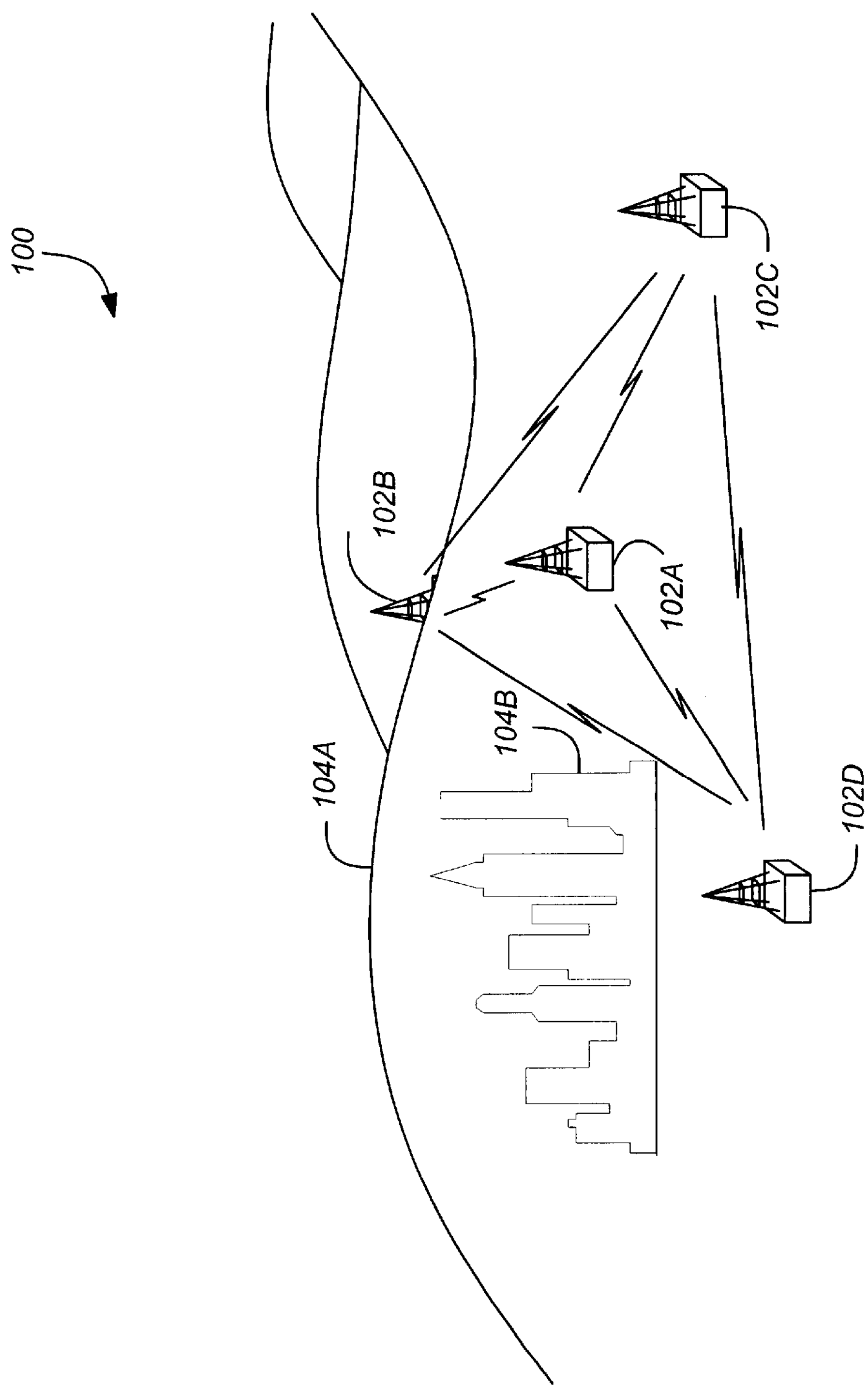
FIG. 1 is a diagram of a radio navigation system.

FIG. 1 is a diagram of a terrestrial location system 100. The system 100 comprises a plurality of stations 102A–102D (hereinafter alternatively collectively referred to as station(s) 102), which transmit signals that the other stations receive and use to determine their respective position. Unlike a space-based navigation system, wherein each of the "stations" are in space and a clear line-of-sight between each of the "stations" is virtually assured, a terrestrial location system 100 must contend with a dynamic environment which can be subject to RF clutter, multipath distortion from nearby objects 104, including natural objects 104A and man-made objects 104B, fading, and other difficulties. The present invention comprises an augmented location system enabled by equipping each station 102 with high performance, low-cost micro-inertial sensors and a low cost spatially resolved antenna.

Figure 2:
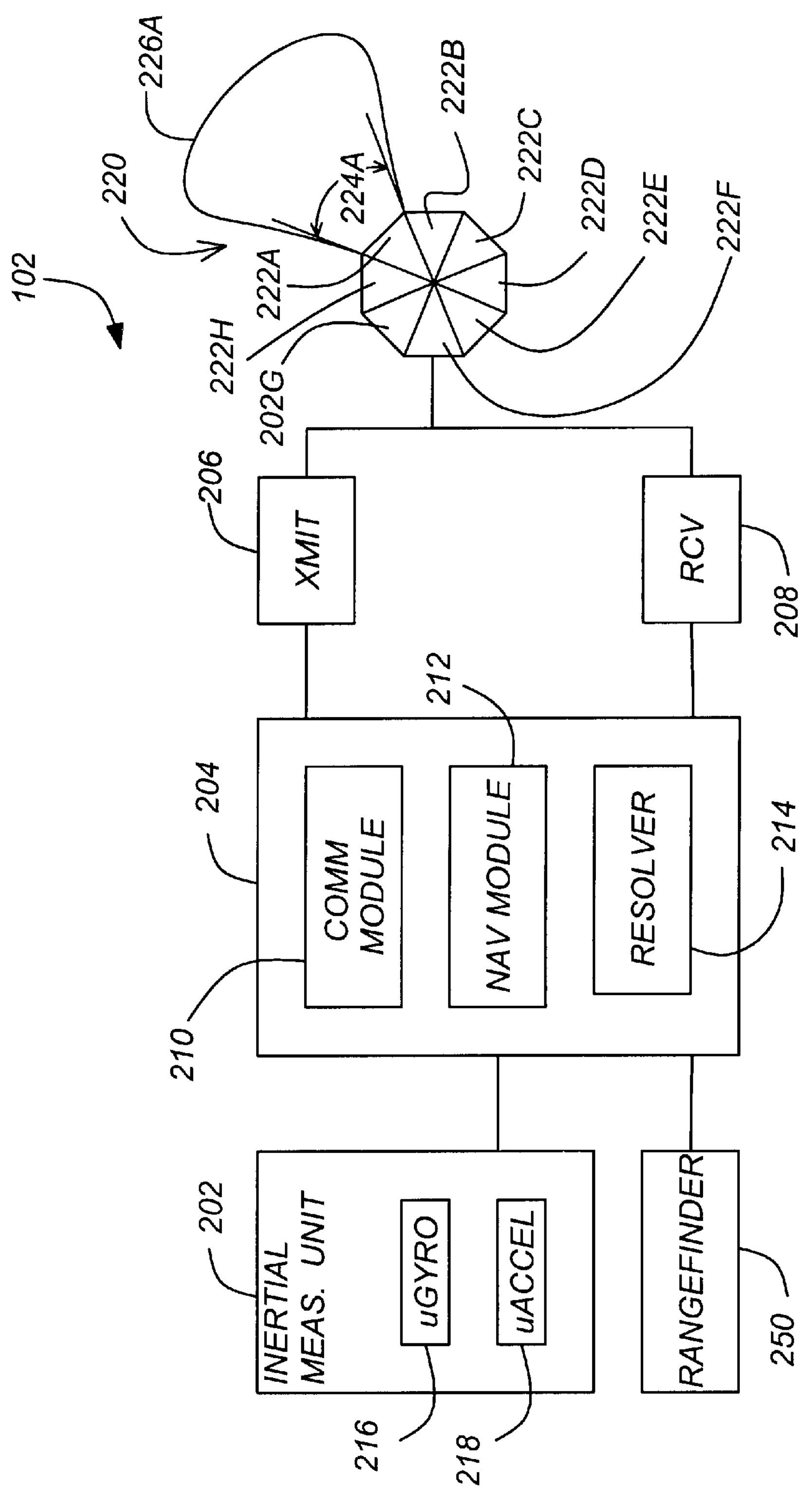
FIG. 2 is a block diagram of an exemplary station.

FIG. 2 is a block diagram of one of the stations 102A of the location system 100. The station 102A comprises an inertial measurement unit (IMU) 202 and a rangefinder 250 communicatively coupled to a location module 204. In one embodiment, the rangefinder is a radio rangefinder. The location module 204 is communicatively coupled to a transmitter 206 and a receiver 208, which are communicatively coupled to an angularly resolved antenna 220 having a plurality of antenna elements 222A–222H. Each of the elements 222A–222H services an angular sector 224 (receives signals transmitted from the sector and transmits signals to entities in the sector 224). Each of the elements 222A–222H of the angularly resolved antenna 220 can be characterized by a reception characteristic (e.g. element 222A has characteristic 226A).

While the foregoing illustrates a single angularly resolved antenna, the invention could be implemented with a plurality of antennas, each primarily responsible for servicing a particular angular sector 224. Further, while an antenna having eight antenna elements 222A–222H serving eight sectors is illustrated in FIG. 2, the number of sectors can be increased or decreased as location accuracy requirements and costs demand. The present invention can also be implemented with a single omni or multi-directional antenna, capable of providing information from which the direction (e.g. heading) of the station 102B–102D transmitting the signal can be determined. Further, instead of sharing a single transmitter 206 and receiver 208, each antenna element 222A–222H can have a dedicated transmitter 206 and/or receiver 208.

Figure 3:
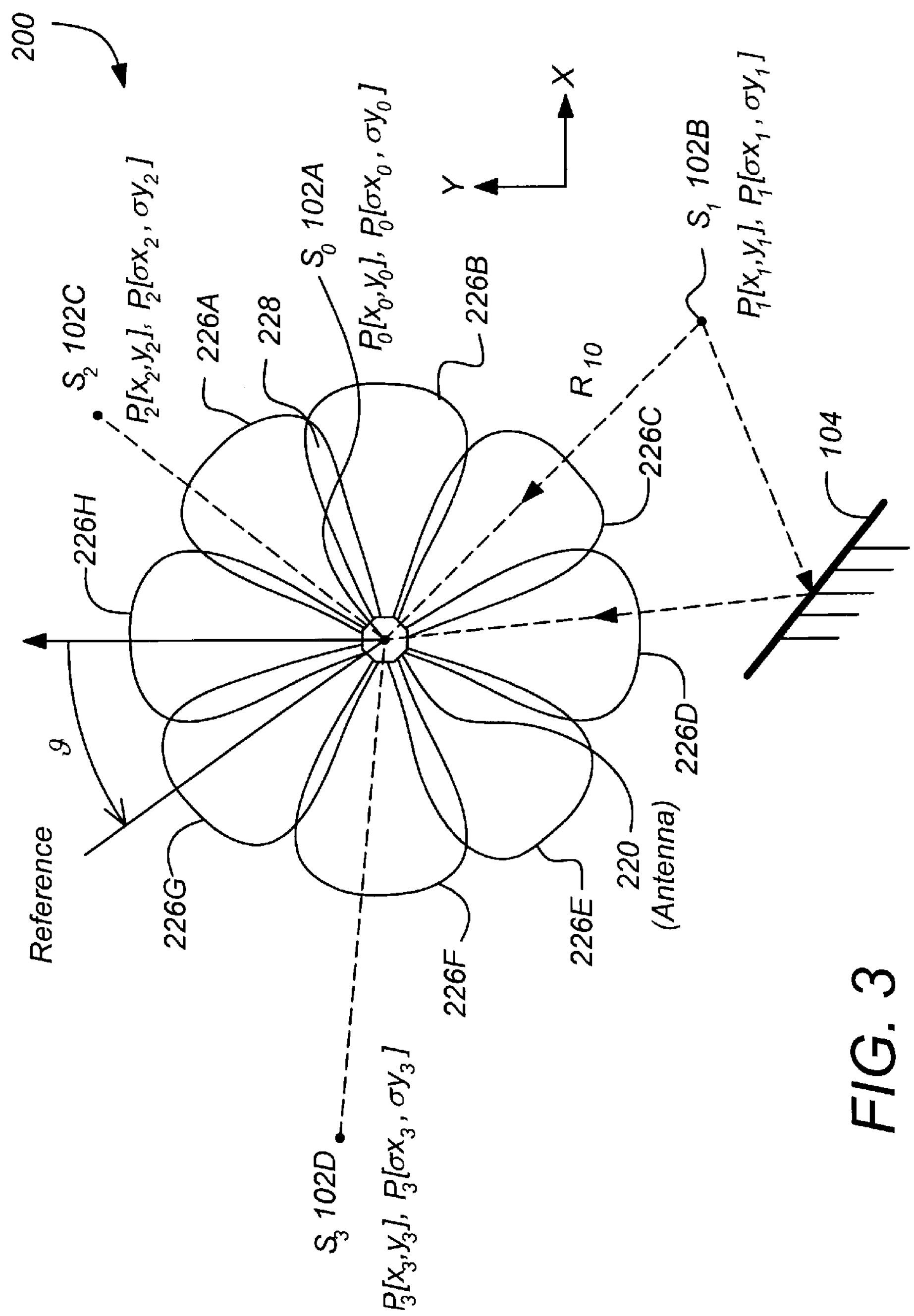
FIG. 3 is a diagram illustrating an exemplary arrangement of stations.

FIG. 3 is a diagram further illustrating the operation of the present invention, describing an exemplary arrangement of stations 102A–102D and the operation of the angularly resolved antenna 220. The system 100 of stations 102 includes a first station 102A (labeled $S_0$) having a state $\Phi_0$ including a position $P_0[x_0,y_0]$, in a two-dimensional x-y plane. The state $\Phi_0$ of the first station 102A may also include an uncertainty of the position of the first station $P_0[\sigma x_0,\sigma y_0]$, the velocity of the station $V_0[x_0,y_0]$, the uncertainty in the velocity of the first station $V_0[\sigma x_0,\sigma y_0]$, and the heading $\Theta_0$ of the station 102A (or antenna 220). The system 100 of stations 102 also includes other stations 102B–102D, $S_n$ each having a state $\Phi_n$ including a position $P_n[x_n,y_n]$ (and optionally an uncertainty of the position $P_n[\sigma x_n,\sigma y_n]$, the velocity of the station $V_n[x_n, y_n]$ and the uncertainty in the velocity of the first station $V_n[\sigma x_n,\sigma y_n]$.

The IMU 202 generates autonomous inertial measurements of the state $\Phi_0$ of the first station 102A. The IMU 202 comprises an angular rate measurement device such as a gyro 210 for measuring inertial angular rates $\omega$ and an accelerometer 218 for measuring inertial accelerations $\alpha$. Typically, the IMU 202 includes at least three gyros 210 and accelerometers 218, thus permitting measurements in three orthogonal directions.

In one embodiment, the IMU 202 is simply a sensor package, and therefore, provides angular rates $\omega$ and lateral accelerations $\alpha$ to the navigation module 204, where initial state information is propagated with the angular rate $\omega$ and lateral acceleration $\alpha$ measurements to produce an angular orientation, attitude, or heading (e.g. $\Theta$ in FIG. 3) and position. In another embodiment, the IMU 202 itself integrates angular rates $\omega$ and acceleration measurements $\alpha$ to provide propagated state variables describing the movement of the station 102A, including its attitude, position, and optionally, velocity. To accomplish this task, the IMU 202 may includes a dedicated processor and memory. The accelerometers 218 and gyros 216 in the IMU 202 may be mechanical devices or are inexpensive microsensors. Microgyros are capable of less than one degree per hour drift rates. Use of such devices together with 60-degree beam sectors (six elements 222) permits missions of several hour duration without the need for gyro updates. Accelerometer bias drift typically determines the required ranging update interval (from signals received from the remaining sections $S_n$) to maintain a desired location accuracy. For example, an accelerometer bias stability of 200 $\mu$g results in a location error of approximately 1.3 feet in less than 20 seconds.

The transmitter 206 accepts information from the location module 204 and generates a signal that is transmitted via the antenna 220 to other stations 102B–102D. In one embodiment, the messages transmitted by the transmitter 206 include a message that conveys the identify of the station 102A and it's estimated state $\Phi_0$ (including, for example the position $P_0[x_0,y_0]$ and position uncertainty $P_0[\sigma x_0,\sigma y_0]$) of the station 102A).

The receiver 208 is communicatively coupled to the antenna elements 222A–222H to receive signals from other stations 102B–102D, and generates a received signal. The received signal comprises the state information $\Phi_1, \Phi_2, \ldots \Phi_n$ from the other stations $S_1, S_2, \ldots S_n$ 102B–102D. This information is provided to the location module 204.

The location module 204 also comprises a resolver 214. The resolver resolves received signals from the receiver 208 to at least one angular sector $\theta$ (e.g. 224A), thus giving the station 102A an indication of the direction from which the received signal came (and hence, a rough idea of the direction of the station 102 that transmitted the signal). In one embodiment, this is accomplished by simply examining the signal from each of the antenna segments 222A–222H, and determining the sector as the antenna segment 222A–222H receiving the strongest signal. In another embodiment, the resolver 214 employs signal processing to resolve the signal into one of the sectors by the measured phase of the each of the signals received by each antenna elements 222A–222H.

The location module 204 also comprises a navigation module 212, which performs the operations required to determine the state $\Phi_0$ (and hence, locate) the first station 102A. This is accomplished by propagating an initial state $\Phi_{initial}$ with the inertial measurements from the IMU 202, and updating the propagated state $\dot{\Phi}_0$ information with further information (including state information $\Phi_1, \Phi_2, \ldots \Phi_n$ received from the other stations $S_1, S_2, \ldots S_n$ 102B–102D, including the current state estimate $P_n[x_n,y_n]$ and variance $P_n[\sigma x_n,\sigma y_n]$ for each of the stations 102B–102D from which a signal is received.

State information $\Phi_n$ can be transmitted among the stations 102A–102D in a number of ways. Nominally, the information content transmitted by each station 102 includes the position $P_n[x_n,y_n]$ and variance $P_n[\sigma x_n,\sigma y_n]$ of the position of the station 102, however, velocity information (e.g. $V_n[x_n,y_n]$ and $V_n[\sigma x_n,\sigma y_n]$) and/or attitude information can be transmitted as well. Also, the information content transmitted by each station 102 can include not only the state information ($P_n[x_n,y_n]$, $P_n[\sigma x_n,\sigma y_n]$) of the station making the transmission, but may also include state information $\Phi$ received from other stations (e.g. station $S_1$ may receive state information $\Phi_2$ regarding station $S_2$, and pass that information along to station $S_0$). This allows each station 102 to operate much like a range extender, permitting each station to receive state information $\Phi_n$ regarding stations that would otherwise be out of range.

The timing of the state information $\Phi_n$ transmissions can be changed to suit different system requirements. For example, state information $\Phi_n$ transmissions from each station 102 can be coordinated or uncoordinated and periodic, or aperiodic. State information can be transmitted when the state $\Phi_n$ of the station 102 transmitting the information has changed a (optionally variable) threshold amount (e.g. when the station has moved so that the position of the station $P_n[x_n,y_n]$ has sufficiently changed), when the station's estimate variance $P_n[\sigma x_n,\sigma y_n]$ exceeds a particular amount, or when the station's estimate variance is below a particular threshold amount (indicating that an accurate update was recently computed by the station 102). Alternatively, state information $\Phi_n$ can be transmitted in response to a request from another station 102. For example, if the variance of the state $\Phi_n$ estimate of the position $P_n[\sigma x_n,\sigma y_n]$ of a particular station 102A has exceeded a threshold value required to perform a particular mission, the station 102A may transmit a request to neighboring stations 102B–102D, requesting that those stations 102B–102D transmit their state information $\Phi_1$, $\Phi_2$, . . . $\Phi_n$ so that the first station 102A can update (and presumably, increase the accuracy of) its state estimate.

The location module 204 also includes a communication module 210. The communication module uses the station 102A updated state information and the state information from the other stations 102B–102D to control communications to the other stations 102B–102D. For example, using information computed in the navigation module 212, the communication module can adjust the power, direction, and/or timing of the signal transmitted to another station 102B–102D or other entity to ameliorate fading, multipath distortion from nearby objects 104, radio frequency (RF) clutter from other stations 102B–102D, and other factors limiting system performance.

Figure 4:
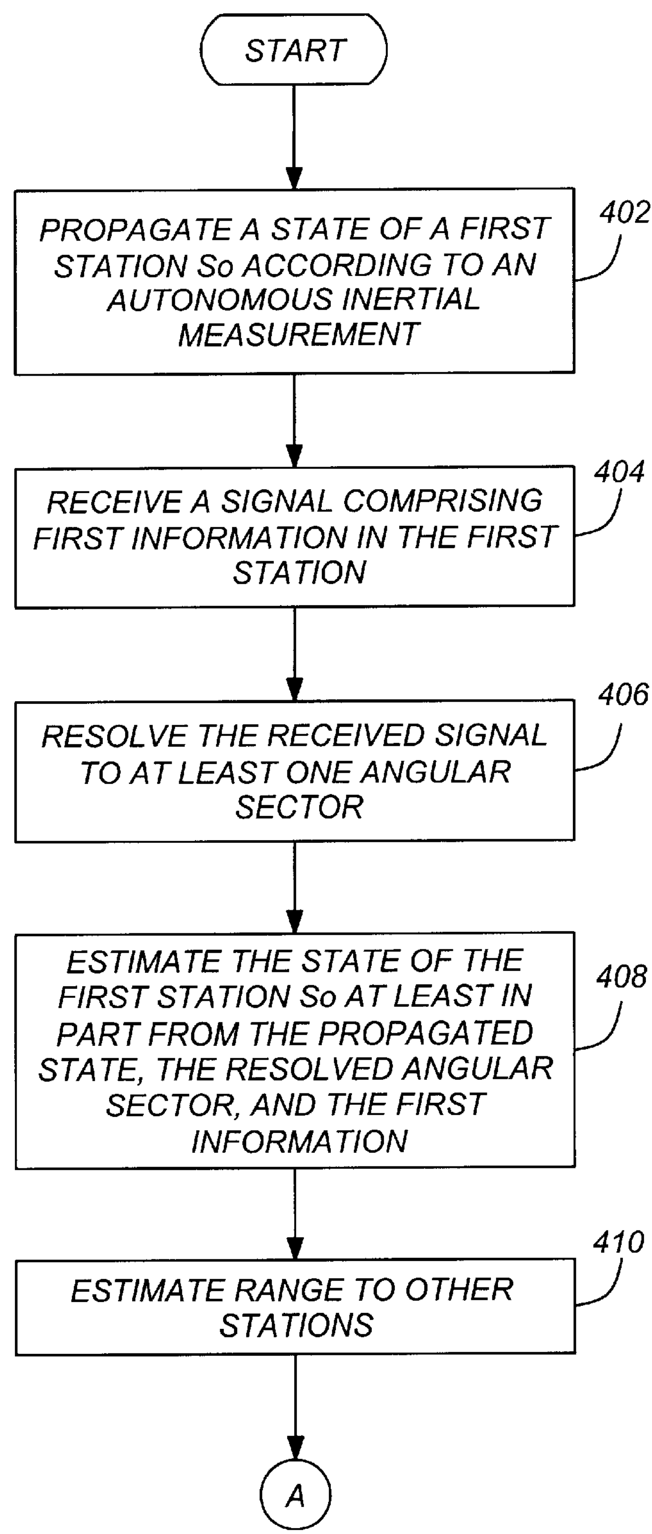
FIG. 4 is a flow chart presenting exemplary process steps that can be used to practice one embodiment of the invention.

FIG. 4 is a flow chart presenting exemplary process steps that can be used to practice the present invention. In block 402, the initial state $\Phi_{initial}$ initial of a first station $S_0$ 102A is propagated according to one or more autonomous inertial measurements. As described above, the autonomous inertial measurements typically include angular rate $\omega$ and lateral acceleration $\alpha$ measurements of the station obtained from an IMU 202 or similar device. A signal is then received from a second station $S_1$ 102B, as shown in block 404. The received signal comprises first information describing an estimated state $\Phi_1$ of the second station 102B, including a position $P_1[x_1,y_1]$ of the second station $S_1$, and may also include additional information such as the variance of the position $P_1[\sigma x_1,\sigma y_1]$, the velocity of the second station $S_1$, $V_1[x_1,y_1]$ and it's variance $V_1[\sigma x_n,\sigma y_n]$.

The received signal is resolved to determine at least one angular sector $\theta$ 224 of the station 102B that transmitted the received signal, as shown in block 406. Noting in FIG. 3 that the antenna element 222A–222H characteristics 226A–226H are such that there can be overlapping coverage between antenna elements (e.g. antenna characteristics 226A and 226B overlap, indicating that a signal transmitted from a station 102 in this area will be received in both antenna element 222A and 222B), it is possible that the signal might be resolved as transitioning between sectors.

In block 408, the state of the first station $S_0$ 102A is estimated at least in part from the propagated state $\dot{\Phi}_0$ of the first station $S_0$ 102A, the resolved angular sector $\theta$ 224, and the first information received from the signal. In one embodiment, the state $\Phi_0$ of the first station $S_0$ is also estimated using the relative range $R_{10}$ from the first station to the second station. The range $R_{10}$ can be determined using a radio rangefinder or similar device. In block 410, the range R to the other stations $R_{0\ to\ n}$ is estimated.

Figure 5:
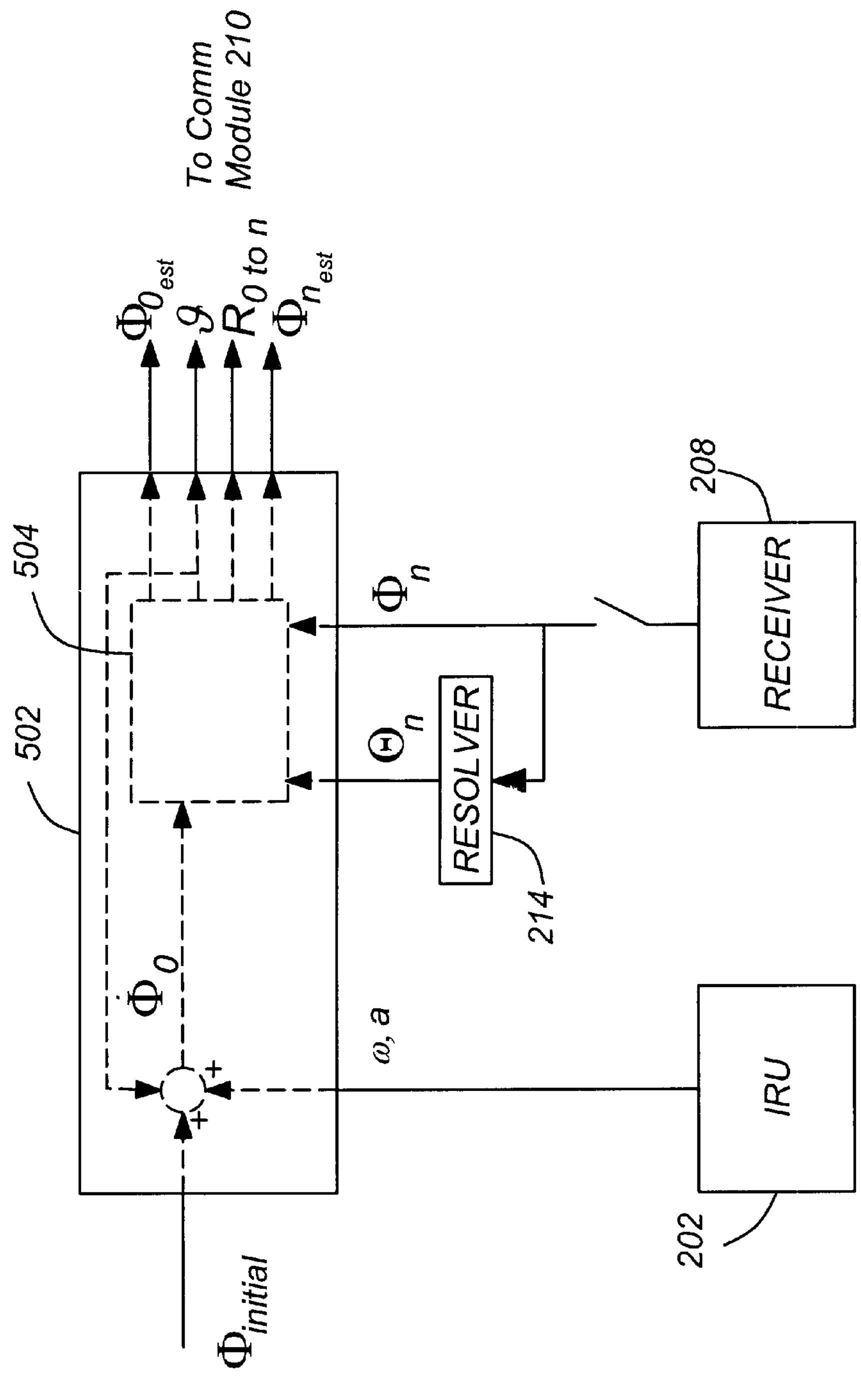
FIG. 5 is a diagram further illustrating the estimate of the state of the first station.

FIG. 5 is a diagram further illustrating the estimate of the state $\Phi_0$ of the first station $S_0$. An initial state $\Phi_{initial}$ is provided to an optimal estimation filter 502 such as a Kalman Filter. The filter 502 is also provided with the inertial measurements $\omega$ and $\alpha$ from the IMU 202, and the initial state $\Phi_{initial}$ is propagated using the inertial measurements to produce a propagated inertial state $\dot{\Phi}_0$. For purposes of simplicity this is illustrated as a simple sum, however it is to be understood that the generation of a propagated inertial state $\dot{\Phi}_0$ includes the application of well-known optimal estimation techniques which consider a plant model, detailed statistics of the appropriate state variables. The propagated state $\dot{\Phi}_0$ is then provided to a predictor 504. The predictor also accepts the state information $\Phi_n$ from stations providing input, and the angular sector $\Theta_n$ from each of the stations from which state information $\Phi_n$ was received. Using these values, a prediction of the state $\Phi_0$ of the first station $S_0$ 102A, the range from the first station $S_0$ 102A to a number of other stations $S_n$ 102B–102D (denoted $R_{0\ to\ n}$) is generated. This can be accomplished by updating the inertial state $\Phi_0$ vector and inertial sensor (gyros and accelerometer) biases based upon a comparison of the measured range and direction (from the received signals) and the predicted range and direction.

The direction or heading of the received signal can also be determined using the signal amplitude ratio from two non-aligned beams (in an embodiment wherein the antenna 220 is an omni-directional antenna) or two adjacent sectors (in the embodiment wherein the antenna 220 is a multi-element antenna). Alternatively, the signal voltages from two adjacent elements can be subtracted and the result divided by their sum to form a conventional beacon error signal that has a null when the received signal direction lies midway between the two element boresight directions. If the sensitivity characteristic of each of the elements serving each sector are known, such differences can be taken into account. The error between the measured and predicted signal ratio or beacon error signal can be used in the filter 502 to update the attitude or heading $\Theta$ of the antenna 220 (and hence, the station 102).

An estimate of the heading $\Theta$ of the first station $S_0$ 102A is also generated. In one embodiment, this is obtained by propagating the initial angular values of $\Phi_0$ with angular rate measurements $\omega$ from the IMU 202, and updating this propagated estimate when two adjacent antenna elements (e.g. 222A and 222B) can receive a signal from the same station. This is possible because the sensitivity characteristic (e.g. 226A and 226B) of the antenna elements 222A and 222B overlap. An updated estimate of the state $\Phi_n$ of the other stations 102B–102D may also be generated, as indicated.

The information derived above (e.g. the state of the first station $S_0$ 102A and the remaining stations $S_1, S_2, \ldots, S_n$) can be used to assist in the reception of the signals transmitted from the remaining stations $S_1, S_2, \ldots, S_n$ and in the transmission of signals from the first station $S_0$ to the remaining stations $S_1, S_2, \ldots, S_n$.

Figure 6A:
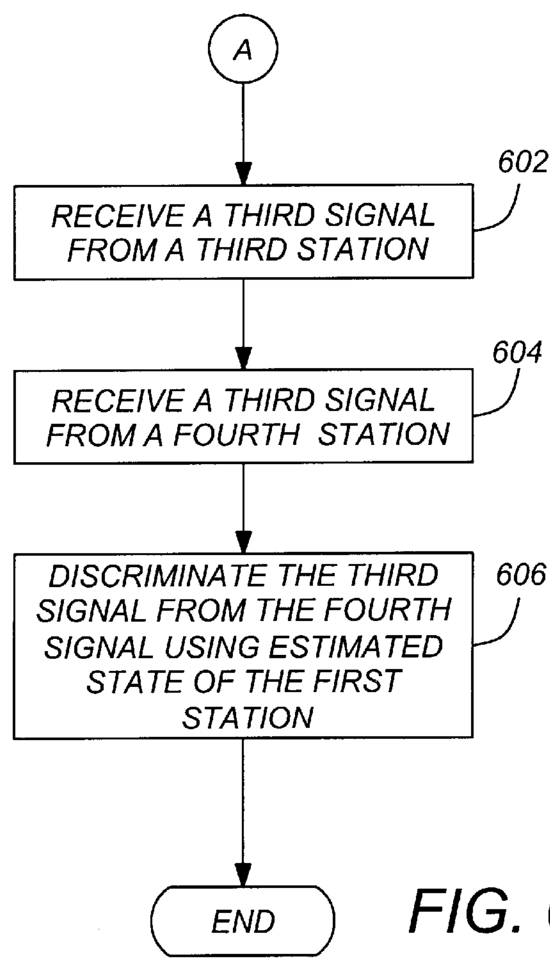
FIGS. 6A and 6B are flow charts presenting further exemplary process steps that can be used to practice one embodiment of the invention.

FIG. 6A is a flow chart presenting exemplary method steps that can be used to assist the first station $S_0$ in the reception of signals in the other stations $S_1, S_2, \ldots, S_n$. A third signal is received from a third station $S_2$ 102C, as shown in block 602. The third signal includes state information $\Phi_2$ regarding the third station $S_2$ 102C. A fourth signal (also including information regarding the state $\Phi_3$ of the fourth station $S_3$), is shown in block 604. The resolver 214 resolves the received signals to indicate the angular sector $\theta_2$, $\theta_3$ from which the respective signals were received. An updated estimate of the state $\Phi_0$ of the first station $S_0$ 102A is computed (as well as optional updates in the estimate of the states $\Phi_2,\Phi_3$ of the third and fourth stations $S_3$ 102C, $S_4$ 102D. This information is used to assist in the discrimination of the signals from the third and fourth stations 102C, 102D.

Figure 6B:
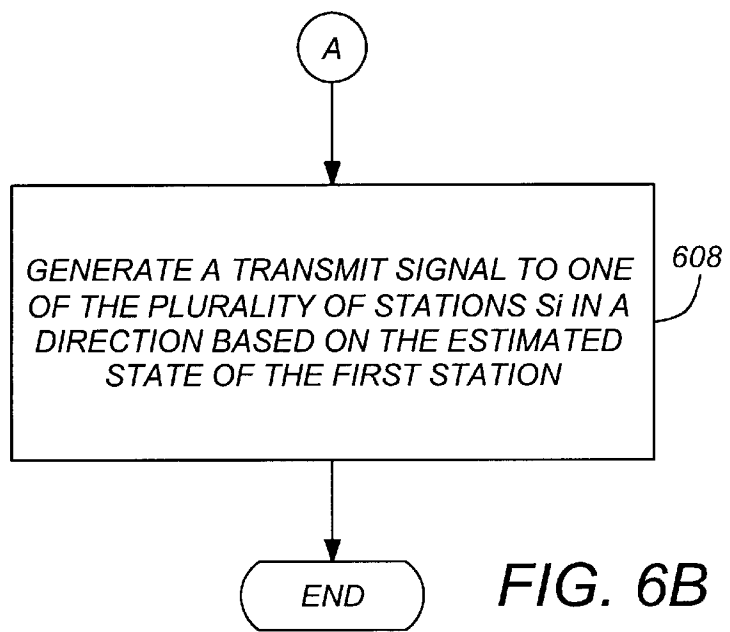

In one embodiment, false ranging from multipath signals can be ameliorated by comparing range estimates from adjacent antenna sectors with estimated relative range and estimated range errors based on estimates from the IMU 202. For the multipath case illustrated in FIG. 3, the relative range measurement $R_{10}$ for station $S_1$ will have a lower value from the rangefinder processing direct signals via sector 226C versus indirect, multipath signals from sector 226D. FIG. 6B is a flow chart illustrating operations that can be used to practice another embodiment of the present invention. In this embodiment, information regarding the state $\Phi_0$ of the first station $S_0$ 102A, and the states $\Phi_1,\Phi_2, \ldots, \Phi_n$ of the other stations $S_1, S_2, \ldots, S_n$ 102B–102D are used to select an optimum transmit antenna beam to communicate or determine range to another station, as shown in block 608.

Any of the stations $S_0, S_1, \ldots, S_n$ 102A–102D can be fixed or mobile. Fixed stations will typically have a smaller location uncertainty $\sigma x$, $\sigma y$. Further, those stations $S_0, S_1, \ldots, S_n$ 102A–102D having a clear line-of-sight to space can also use GPS to determine location. In the event that two stations are disposed within the same sector 226, the communications channel can be used to enable coordinated radio ranging.

The foregoing can be used to maintain accurate location of troops deployed in rugged, communication unfriendly environments, for purposes of reconnaissance, target designation, or in avoiding friendly fire. Target information or reconnaissance data can be directed to a weapons platform using synthetic aperture narrow-beam communications to avoid detection or interception of the communications. This can be accomplished by coordinating the sector, phase, and amplitude of the signal transmitted from each station's 102 antenna 220, thereby using the network of antennas 220 to implement a synthetic aperture beam-forming antenna. Coordination can be accomplished via centralized control (e.g. commands to each station 102 from one or more central sources) or by pre-arranged parameters.

The antenna 202 itself may be a conformal helmet, or hat-mounted or backpack-mounted, using embedded antenna technology. The IMU 202, transmitter 206 and receiver 208, and location module 204 can be integrated into volume of approximately one inch cubed.

Communication of signals among the stations $S_0, S_1, \ldots, S_n$ 102A–102D can be accomplished in a number of ways. Typically, low data-rate communications are sufficient. A variety of modulation and multiplexing techniques can be employed to minimize exposure to jamming or interception, including frequency division multiple access (FDMA), code division multiple access (CDMA), time division multiple access (TDMA) or other spread spectrum techniques.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of radio navigation among a plurality of stations $S_0, S_1, \ldots, S_i$, comprising the steps of:

propagating a state of a first station $S_0$ according to autonomous inertial measurements, wherein the state includes the position $P_0[x_0,y_0]$ of the first station, wherein $x_0$ is the position of the first station along a first axis, and $y_0$ is the position of the first station along a second axis orthogonal to the first axis;

receiving a signal in the first station and resolving the received signal to at least one angular sector in a plane formed by the first axis x and the second axis y, the received signal comprising first information describing an estimated state of a second station $S_1$, wherein the state includes a position $P_1[x_1,y_1]$ of the second station $S_1$ and estimating the state of the first station $S_0$ at least in part from the propagated state, the resolved angular sector, and the first information.

2. The method of claim 1, wherein the state of the first station $S_0$ is further estimated from a measured range of the second station from the first station.

3. The method of claim 1, wherein:

the method further comprises the step of receiving a second signal in the first station and resolving the received second signal to a second at least one angular sector in the plane formed by the first axis x and the second axis y, the received second signal comprising second information describing an estimated position of a third station $S_3$; and wherein the state of the first station $S_0$ is further estimated according to the resolved second angular sector and the second information.

4. The method of claim 3, further comprising the steps of:

estimating a range from at least a subset of the plurality of stations $S_0, S_1, \ldots, S_i$ at least in part from the estimated state of the first station $S_0$.

5. The method of claim 4, wherein the range from at least a subset of the plurality of stations $S_0, S_1, \ldots, S_i$ is further estimated at least in part from the first information and the second information.

6. The method of claim 1, further comprising the step of transmitting the estimated state of the first station $S_0$, to at least one of the plurality of other stations $S_1, S_2, \ldots, S_i$.

7. The method of claim 1, further comprising the steps of:

receiving a third signal;

receiving a fourth signal having a multipath component; and discriminating the third signal from the fourth signal at least in part according to the estimated state of the first station $S_0$.

8. The method of claim 7, wherein the third signal is further discriminated from the fourth signal according to the estimated state of the second station $S_1$.

9. The method of claim 7, wherein:

the third signal is received from the second station $S_1$; and the third signal is further discriminated from the fourth signal according to the estimated state of the second station $S_1$.

10. The method of claim 7, wherein the third signal is received from a fourth station $S_4$.

11. The method of claim 1, further comprising the steps of:

generating a transmit signal to one of the plurality of stations $S_i$ based upon the estimated state of the first station $S_0$.

12. The method of claim 11, wherein the one of the plurality of stations is the second station $S_1$ and the transmit signal is further based upon the received signal information describing the estimated state of the second station $S_1$ and the resolved angular sector.

13. The method of claim 11, wherein the transmit signal is generated in a direction determined from the estimated state of the first station $S_0$.

14. The method of claim 13, wherein the transmit signal is further generated of a power determined from the estimated state of the first station $S_0$.

15. The method of claim 12, wherein the transmit signal is generated to reduce multipath distortion between the transmit signal and other signals received by the one of the plurality of stations $S_i$.

16. The method of claim 1, wherein the step of resolving the received signal to at least one angular sector comprises the steps of:

comparing the signal received in the at least one sector with the signal received in an adjacent sector.

17. The method of claim 1, wherein the received signal is resolved via one of a plurality of antenna sectors delineated within a plane defined by the first axis and the second axis at the first station.

18. The method of claim 1, wherein the step of resolving the received signal to at least one angular sector comprises the step of:

receiving the signal in a first antenna corresponding to a first sector.

19. The method of claim 1, wherein the step of resolving the received signal to at least one angular sector comprises the steps of:

receiving the signal in a first antenna element corresponding to a first sector;

receiving the signal in a second antenna element corresponding to another sector adjacent the first sector; and resolving the received signal to the angular sector by comparing a strength of the signal received in the first antenna element with a strength of the signal received in the second antenna element.

20. The method of claim 1, wherein the signal is received from the second station $S_1$.

21. The method of claim 1, wherein the signal is received via a third station $S_2$.

22. The method of claim 1, wherein the information is received aperiodically.

23. The method of claim 1, wherein the state further includes an orientation $\psi$ of the first station $S_0$.

24. The method of claim 1, wherein the state further includes an uncertainty $\sigma$ in the position of the first station $S_0$.

25. An apparatus for radio navigation among a plurality of stations $S_0, S_1, \ldots, S_i$, comprising:

means for propagating a state of a first station $S_0$ according to autonomous inertial measurements, wherein the state includes the position $P_0[x_0,y_0]$ of the first station, wherein $x_0$ is the position of the first station along a first axis, and $y_0$ is the position of the first station along a second axis orthogonal to the first axis;

means for receiving a signal in the first station and resolving the received signal to at least one angular sector in a plane formed by the first axis x and the second axis y, the received signal comprising first information describing an estimated state of a second station $S_1$, wherein the state includes a position $P_1[x_0, y_0]$ of the second station $S_1$ and means for estimating the state of the first station $S_0$ at least in part from the propagated state, the resolved angular sector, and the first information.

26. The apparatus of claim 25, wherein the means for estimating the state of the first station $S_0$ at least in part from the propagated state, the resolved angular sector, and the first information further estimates the state of the first station $S_0$ at least in part from a range from the first station to the second station.

27. The apparatus of claim 25, further comprising means for receiving a second signal in the first station and means for resolving the received second signal to a second at least one angular sector in the plane formed by the first axis x and the second axis y, the received second signal comprising second information describing an estimated position of a third station $S_3$; and wherein the state of the first station $S_0$ is further estimated according to the resolved second angular sector and the second information.

28. The apparatus of claim 27, further comprising:

means for estimating a range from at least a subset of the plurality of stations $S_0, S_1, \ldots, S_i$ at least in part from the estimated state of the first station $S_0$.

29. The apparatus of claim 28, wherein the range from at least a subset of the plurality of stations $S_0, S_1, \ldots, S_i$ is further estimated at least in part from the first information and the second information.

30. The apparatus of claim 25, further comprising:

means for transmitting the estimated state of the first station $S_0$, to at least one of the plurality of other stations $S_1, S_2, \ldots, S_i$.

31. The apparatus of claim 25, further comprising:

means for receiving a third signal;

means for receiving a fourth signal having a multipath component; and means for discriminating the third signal from the fourth signal at least in part according to the estimated state of the first station $S_0$.

32. The apparatus of claim 31, wherein the third signal is further discriminated from the fourth signal according to the estimated state of the second station $S_1$.

33. The apparatus of claim 31, wherein:

the third signal is received from the second station $S_1$; and the third signal is further discriminated from the fourth signal according to the estimated state of the second station $S_1$.

34. The apparatus of claim 31, wherein the third signal is received from a fourth station $S_4$.

35. The apparatus of claim 25, comprising:

means for generating a transmit signal to one of the plurality of stations $S_i$ based upon the estimated state of the first station $S_0$.

36. The apparatus of claim 35, wherein the one of the plurality of stations is the second station $S_1$ and the transmit signal is further based upon the received signal information describing the estimated state of the second station $S_1$ and the resolved angular sector.

37. The apparatus of claim 35, wherein the transmit signal is generated in a direction determined from the estimated state of the first station $S_0$.

38. The apparatus of claim 35, wherein the transmit signal is further generated of a power determined from the estimated state of the first station $S_0$.

39. The apparatus of claim 36, wherein the transmit signal is generated to reduce multipath distortion between the transmit signal and other signals received by the one of the plurality of stations $S_i$.

40. The apparatus of claim 25, wherein the step of resolving the received signal to at least one angular sector comprises:

means for comparing the signal received in the at least one sector with the signal received in an adjacent sector.

41. The apparatus of claim 25, wherein the received signal is resolved via one of a plurality of antenna sectors delineated within a plane defined by the first axis and the second axis at the first station.

42. The apparatus of claim 25, wherein the means for resolving the received signal to at least one angular sector comprises:

means for receiving the signal in a first antenna corresponding to a first sector.

43. The apparatus of claim 25, wherein the means for resolving the received signal to at least one angular sector comprises:

means for receiving the signal in a first antenna element corresponding to a first sector;

means for receiving the signal in a second antenna element corresponding to another sector adjacent the first sector; and means for resolving the received signal to the angular sector by comparing a strength of the signal received in the first antenna element with a strength of the signal received in the second antenna element.

44. The apparatus of claim 25, wherein the signal is received from the second station $S_1$.

45. The apparatus of claim 25, wherein the signal is received via a third station $S_2$.

46. The apparatus of claim 25, wherein the information is received aperiodically.

47. The apparatus of claim 25, wherein the state further includes an orientation $\psi$ of the first station $S_0$.

48. The apparatus of claim 25, wherein the state further includes an uncertainty $\sigma$ in the position of the first station $S_0$.

49. An apparatus for radio navigation among a plurality of stations $S_0, S_1, \ldots, S_i$, comprising:

an inertial reference unit for generating inertial measurements of a state of the first station;

a navigation module, for propagating the state of the first station $S_0$ based upon the inertial measurements wherein the state includes the position $P_0[x_0,y_0]$ of the first station, wherein $x_0$ is the position of the first station along a first axis, and $y_0$ is the position of the first station along a second axis orthogonal to the first axis;

at least one antenna communicatively coupled to a receiver for receiving a signal comprising first information describing an estimated state of a second station $S_1$, wherein the state includes a position $P_1[x_0,y_0]$ of the second station $S_2$;

a resolver, for resolving the received signal to at least one angular sector in a plane formed by the first axis x and the second axis y; and wherein the navigation module further estimates the state of the first station $S_0$ at least in part from the propagated state, the resolved angular sector, and the first information.

50. The apparatus of claim 49, further comprising a rangefinder for measuring the range from the first station to the second station.

51. The apparatus of claim 49, wherein:

the antenna and receiver further receive a second signal, the received second signal comprising second information describing an estimated position of a third station $S_3$;

the resolver resolves the second signal to a second at least one angular sector in the plane formed by the first axis x and the second axis y; and the navigation module further estimates the state of the first station $S_0$ according to the resolved second angular sector and the second information.

52. The apparatus of claim 51, wherein the navigation module further estimates a range from at least a subset of the plurality of stations $S_0, S_1, \ldots, S_i$ at least in part from the estimated state of the first station $S_0$.

53. The apparatus of claim 52, wherein the navigation module further estimates the range from at least a subset of the plurality of stations $S_0, S_1, \ldots, S_i$ at least in part from the first information and the second information.

54. The apparatus of claim 49, further comprising:

a transmitter for transmitting the estimated state of the first station $S_0$, to at least one of the plurality of other stations $S_1, S_2, \ldots, S_i$.

55. The apparatus of claim 49, wherein:

the antenna and receiver further receive a third signal and a fourth signal having a multipath component; and the apparatus further comprises a communication module for discriminating the third signal from the fourth signal at least in part according to the estimated state of the first station $S_0$.

56. The apparatus of claim 55, wherein the third signal is further discriminated from the fourth signal according to the estimated state of the second station $S_1$.

57. The apparatus of claim 55, wherein:

the third signal is received from the second station $S_1$; and the third signal is further discriminated from the fourth signal according to the estimated state of the second station $S_1$.

58. The apparatus of claim 55, wherein the third signal is received from a fourth station $S_4$.

59. The apparatus of claim 49, wherein the communication module further generates a transmit signal to one of the plurality of stations $S_i$ based upon the estimated state of the first station $S_0$.

60. The apparatus of claim 59, wherein the one of the plurality of stations is the second station $S_1$ and the transmit signal is further based upon the received signal information describing the estimated state of the second station $S_1$ and the resolved angular sector.

61. The apparatus of claim 59, wherein the transmit signal is generated in a direction determined from the estimated state of the first station $S_0$.

62. The apparatus of claim 61, wherein the transmit signal is further generated of a power determined from the estimated state of the first station $S_0$.

63. The apparatus of claim 60, wherein the transmit signal is generated to reduce multipath distortion between the transmit signal and other signals received by the one of the plurality of stations $S_i$.

64. The apparatus of claim 49, wherein the resolver compares the signal received in the at least one sector with the signal received in an adjacent sector.

65. The apparatus of claim 49, wherein the antenna receives signals in one of a plurality of antenna sectors delineated within a plane defined by the first axis and the second axis at the first station.

66. The apparatus of claim 49, wherein the resolver comprises means for receiving the signal in a first antenna corresponding to a first sector.

67. The apparatus of claim 49, wherein the resolver comprises:

the antenna comprises a first antenna element corresponding to a first sector for receiving the signal;

a second antenna element corresponding to a second sector for receiving the second signal;

and wherein the resolver resolves the received signal to the angular sector by comparing a strength of the signal received in the first antenna element with a strength of the signal received in the second antenna element.

68. The apparatus of claim 49, wherein the signal is received from the second station $S_1$.

69. The apparatus of claim 49, wherein the signal is received via a third station $S_2$.

70. The apparatus of claim 49, wherein the information is received aperiodically.

71. The apparatus of claim 49, wherein the state further includes an orientation $\psi$ of the first station $S_0$.

72. The apparatus of claim 49, wherein the state further includes an uncertainty $\sigma$ in the position of the first station $S_0$.

* * * * *